(12) United States Patent
Henry et al.

(10) Patent No.: US 8,341,419 B2
(45) Date of Patent: Dec. 25, 2012

(54) APPARATUS AND METHOD FOR LIMITING ACCESS TO MODEL SPECIFIC REGISTERS IN A MICROPROCESSOR

(75) Inventors: G. Glenn Henry, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 255 days.

(21) Appl. No.: 12/781,087

(22) Filed: May 17, 2010

(65) Prior Publication Data

US 2010/0235645 A1 Sep. 16, 2010

Related U.S. Application Data

(63) Continuation-in-part of application No. 12/391,781, filed on Feb. 24, 2009.

(60) Provisional application No. 61/095,350, filed on Sep. 9, 2008, provisional application No. 61/232,236, filed on Aug. 7, 2009.

(51) Int. Cl.
*G06F 21/00* (2006.01)

(52) U.S. Cl. ........................................ 713/183

(58) Field of Classification Search ................... 713/183
See application file for complete search history.

(56) References Cited

U.S. PATENT DOCUMENTS

| | | | |
|---|---|---|---|
| 5,774,544 A | 6/1998 | Lee et al. | |
| 5,790,663 A | 8/1998 | Lee et al. | |
| 5,790,783 A | 8/1998 | Lee et al. | |
| 6,154,818 A | 11/2000 | Christie | |
| 6,704,872 B1 | 3/2004 | Okada | |
| 7,043,616 B1 * | 5/2006 | McGrath | 711/163 |
| 7,366,849 B2 * | 4/2008 | Poisner | 711/152 |
| 7,366,911 B2 * | 4/2008 | Garay et al. | 713/180 |
| 8,130,959 B2 * | 3/2012 | Goodman et al. | 380/273 |
| 2003/0101322 A1 * | 5/2003 | Gardner | 711/163 |
| 2003/0196096 A1 | 10/2003 | Sutton | |
| 2004/0139346 A1 | 7/2004 | Watt et al. | |
| 2004/0190558 A1 | 9/2004 | Oliver | |
| 2007/0006213 A1 | 1/2007 | Shahidzadeh et al. | |
| 2007/0098152 A1 | 5/2007 | Detrick et al. | |
| 2008/0163383 A1 | 7/2008 | Kumar et al. | |
| 2009/0096481 A1 | 4/2009 | Butter | |

OTHER PUBLICATIONS

"Live Migration with AMD-V™ Extended Migration Technology." AMD White Paper. pp. 1-8. Downloaded from http://developer.amd.com/assets/Live%20Virtual%20Machine%20Migration%20on%20AMD%20processors.pdf. Downloaded on Sep. 5, 2008.

* cited by examiner

*Primary Examiner* — Kambiz Zand
*Assistant Examiner* — Abiy Getachew
(74) *Attorney, Agent, or Firm* — E. Alan Davis; James W. Huffman

(57) ABSTRACT

A microprocessor having a control register to which the manufacturer of the microprocessor may limit access. The microprocessor includes a manufacturing identifier that uniquely identifies the microprocessor and that is externally readable from the microprocessor by a user. The microprocessor also includes a secret key, manufactured internally within the microprocessor and externally invisible. The microprocessor also includes an encryption engine, coupled to the secret key, configured to decrypt a user-supplied password using the secret key to generate a decrypted result in response to a user instruction instructing the microprocessor to access the control register. The user-supplied password is unique to the microprocessor. The microprocessor also includes an execution unit, coupled to the manufacturing identifier and the encryption engine, configured to allow the instruction access to the control register if the manufacturing identifier is included in the decrypted result, and to otherwise deny the instruction access to the control register.

22 Claims, 4 Drawing Sheets

APPARATUS AND METHOD FOR LIMITING ACCESS TO MODEL SPECIFIC REGISTERS IN A MICROPROCESSOR

CROSS REFERENCE TO RELATED APPLICATION(S)

This application is a continuation-in-part of U.S. Non-provisional application Ser. No. 12/391,781, filed Feb. 24, 2009, which claims priority based on U.S. Provisional Application Ser. No. 61/095,350, filed Sep. 9, 2008, each of which is hereby incorporated by reference in its entirety. Additionally, this application claims priority based on U.S. Provisional Application Ser. No. 61/232,236, filed Aug. 7, 2009, entitled APPARATUS AND METHOD FOR LIMITING ACCESS TO MODEL SPECIFIC REGISTERS IN A MICROPROCESSOR, which is hereby incorporated by reference in its entirety.

This application is related to U.S. Non-Provisional application Ser. No. 12/781,124, filed concurrently herewith, entitled APPARATUS AND METHOD FOR GENERATING UNPREDICTABLE PROCESSOR-UNIQUE SERIAL NUMBER FOR USE AS AN ENCRYPTION KEY, which is hereby incorporated by reference in its entirety.

FIELD OF THE INVENTION

The present invention relates in general to the field of model specific registers in a microprocessor, and particularly to limiting user access thereto.

BACKGROUND OF THE INVENTION

A processor has many internal control registers that are normally accessible only by microcode. An example is a bus control register, which controls details such as timing on the processor bus, the exact bus protocols to be used, etc. In the process of testing and debugging a system in which the processor is employed, it is often desirable for the tester/debugger to be able to execute an external program to set (or read) these internal control registers. For example, the tester/debugger might want to try different timing on the processor bus. Furthermore, it is often desirable to access these internal registers as part of the manufacturing test process.

The x86 architecture, for example, includes the RDMSR and WRMSR instructions in its instruction set to read and write model specific registers (MSRs). A tester/debugger may access the internal control registers of an x86 processor via the RDMSR and WRMSR instructions. However, if not used correctly, accessing some of the internal control registers can cause the processor to work incorrectly, work slowly, or not work at all. Additionally, accessing some of the internal control registers can enable the user to bypass security mechanisms, e.g., allowing ring 0 access at ring 3. In addition, these control registers may reveal information that the processor designers wish to keep proprietary. For these reasons, the various x86 processor manufacturers have not publicly documented any description of the address or function of some control MSRs.

Nevertheless, the existence and location of the undocumented control MSRs are easily found by programmers, who typically then publish their findings for all to use. Furthermore, a processor manufacturer may need to disclose the addresses and description of the control MSRs to its customers for their testing and debugging purposes. The disclosure to the customer may result in the secret of the control MSRs becoming widely known, and thus usable by anyone on any processor.

A more rigorous approach goes a step further and requires that a secret "access key" be placed in a register prior to execution of a RDMSR/WRMSR to access a protected MSR. If the access key value is not correct, the RDMSR/WRMSR fails and the processor does not read/write the specified MSR. In theory, the key value must be obtained from the processor manufacturer. Unfortunately, soon after the manufacturer provides the key value to one customer, it may get publicized and other unauthorized people can use the publicized access key to access the control registers.

BRIEF SUMMARY OF INVENTION

In one aspect the present invention provides a microprocessor having a control register to which the manufacturer of the microprocessor may limit access. The microprocessor includes a manufacturing identifier that uniquely identifies the microprocessor. The manufacturing identifier is externally readable from the microprocessor by a user. The microprocessor also includes a secret key, manufactured internally within the microprocessor and externally invisible. The microprocessor also includes an encryption engine, coupled to the secret key, configured to decrypt a user-supplied password using the secret key to generate a decrypted result in response to a user instruction instructing the microprocessor to access the control register. The user-supplied password is unique to the microprocessor. The microprocessor also includes an execution unit, coupled to the manufacturing identifier and the encryption engine, configured to allow the instruction access to the control register if the manufacturing identifier is included in the decrypted result, and to otherwise deny the instruction access to the control register.

In another aspect, the present invention provides a method for limiting access to a control register of a microprocessor. The method includes decoding a user instruction instructing the microprocessor to access the control register. The method also includes decrypting a user-supplied password using a secret key to generate a decrypted result in response to said decoding. The user-supplied password is unique to the microprocessor. The secret key is manufactured internally within the microprocessor but is externally invisible. The method also includes denying the instruction access to the control register if a manufacturing identifier is not included in the decrypted result. The manufacturing identifier uniquely identifies the microprocessor and is externally readable from the microprocessor by a user. The decoding, decrypting, and denying are all performed by the microprocessor.

In yet another aspect, the present invention provides a microprocessor having a control register to which the manufacturer of the microprocessor may limit access. The microprocessor includes a manufacturing identifier that uniquely identifies the microprocessor. The manufacturing identifier is externally readable from the microprocessor by a user. The microprocessor also includes a secret key, manufactured internally within the microprocessor and externally invisible. The microprocessor also includes an encryption engine, coupled to the secret key, configured to encrypt the manufacturing identifier using the secret key to generate an encrypted result in response to a user instruction instructing the microprocessor to access the control register. The microprocessor also includes an execution unit, coupled to the encryption engine, configured to allow the instruction access to the control register if the encrypted result matches a user-supplied password, and to otherwise deny the instruction access to the control register, wherein the user-supplied password is unique to the microprocessor.

In yet another aspect, the present invention provides a method for limiting access to a control register of a microprocessor. The method includes decoding a user instruction instructing the microprocessor to access the control register. The method also includes encrypting a manufacturing identifier using a secret key to generate an encrypted result in response to said decoding. The secret key is manufactured internally within the microprocessor but is externally invisible. The manufacturing identifier uniquely identifies the microprocessor and is externally readable from the microprocessor by a user. The method also includes denying the instruction access to the control register if the encrypted result does not match a user-supplied password. The user-supplied password is unique to the microprocessor. The decoding, encrypting, and denying are all performed by the microprocessor.

In one embodiment, the user-supplied password comprises a value provided by the manufacturer to the user. In one embodiment, the user-supplied password is generated by the manufacturer by encrypting the uniquely-identifying manufacturing identifier of the microprocessor with a same encryption algorithm used by the encryption engine to decrypt the user-supplied password. In one embodiment, the encryption engine comprises an advanced encryption standard (AES) engine. In one embodiment, the secret key is known only by the manufacturer of the microprocessor. In one embodiment, the secret key is readable only by microcode of the microprocessor.

DETAILED DESCRIPTION OF THE INVENTION

To solve the problem described above, embodiments described herein extend the access key approach by making each processor have a different access key. Therefore, even if the access key for a particular processor part gets published, the potential risk is limited to that one particular processor part.

Figure 1:
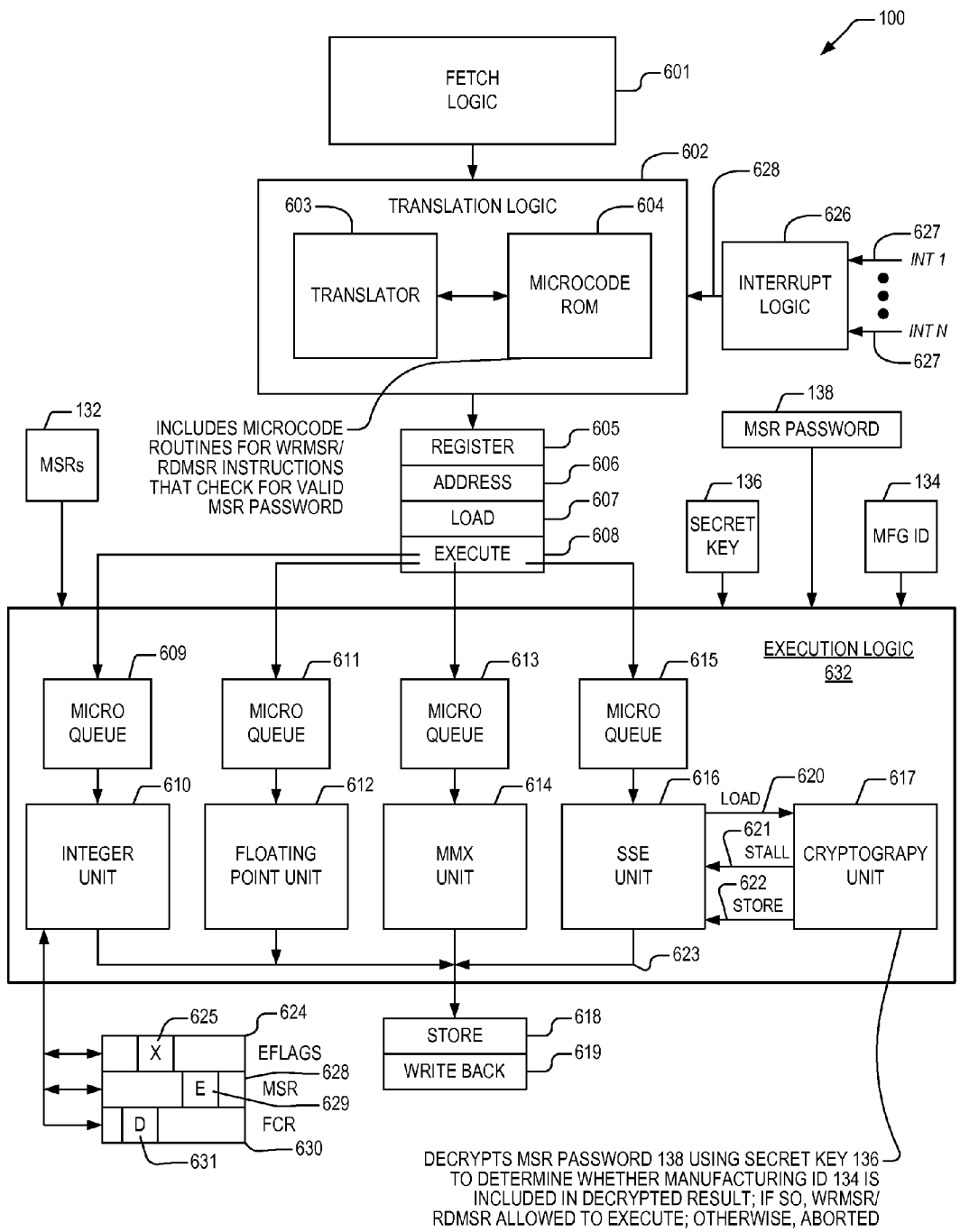
FIG. 1 is a block diagram illustrating a microprocessor according to the present invention.

Referring now to FIG. 1, a block diagram illustrating a microprocessor 100 according to the present invention is shown. The microprocessor 100 is similar to the microprocessor 600 described in detail in FIG. 6 of U.S. Pat. No. 7,321,910 (CNTR.2224). However, the microprocessor 100 of FIG. 1 also includes MSRs 132, a manufacturing ID 134, a secret key 136, and an MSR password 138, all coupled to be received by the execution logic 632.

Some of the MSRs 132 are password-protected and some are not. In one embodiment, the microcode ROM 604 stores a list of password-protected MSRs 132 that the microcode consults when it implements a RDMSR/WRMSR in order to determine whether to limit access, i.e., to require the valid password. In one embodiment, each MSR 132 has one of four password-protection types: (1) Not Protected, i.e., can be read or written using architected rules; (2) Protected for Read (for example, the MSR that is used to read out the microcode of the microprocessor 100); (3) Protected for Write (for example, internal control registers that control the bus timing or protocol, or that control various performance or power saving features of the microprocessor 100); (4) Protected for both Read and Write.

Additionally, the microcode ROM 604 is further configured to store microcode routines to implement RDMSR and WRMSR instructions that check for a valid password before granting access to protected MSRs 132. Finally, the cryptography unit 617 is further configured to decrypt the MSR password 138 using the secret key 136 to determine whether the manufacturing ID 134 is included in the decrypted result.

Figure 2:
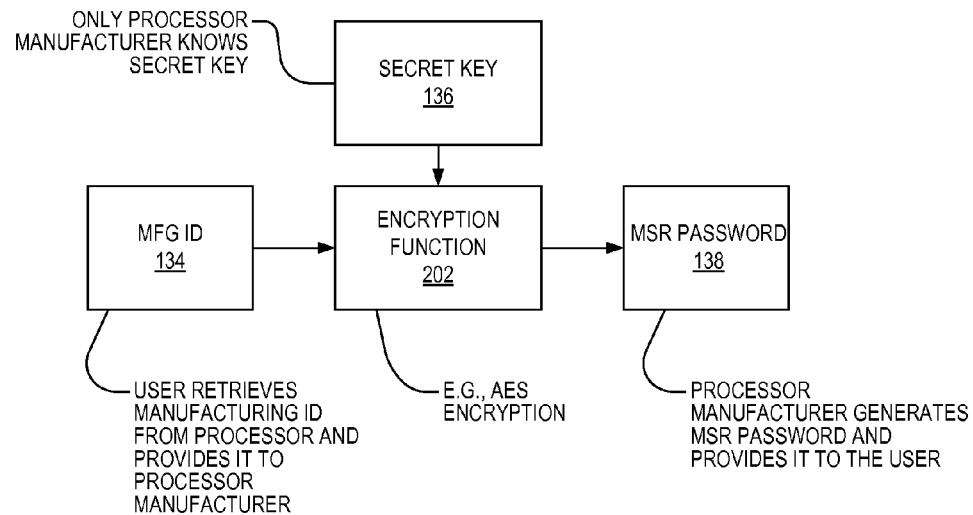
FIG. 2 is a block diagram illustrating steps described in blocks 402 through 406 of FIG. 4.
Figure 3:
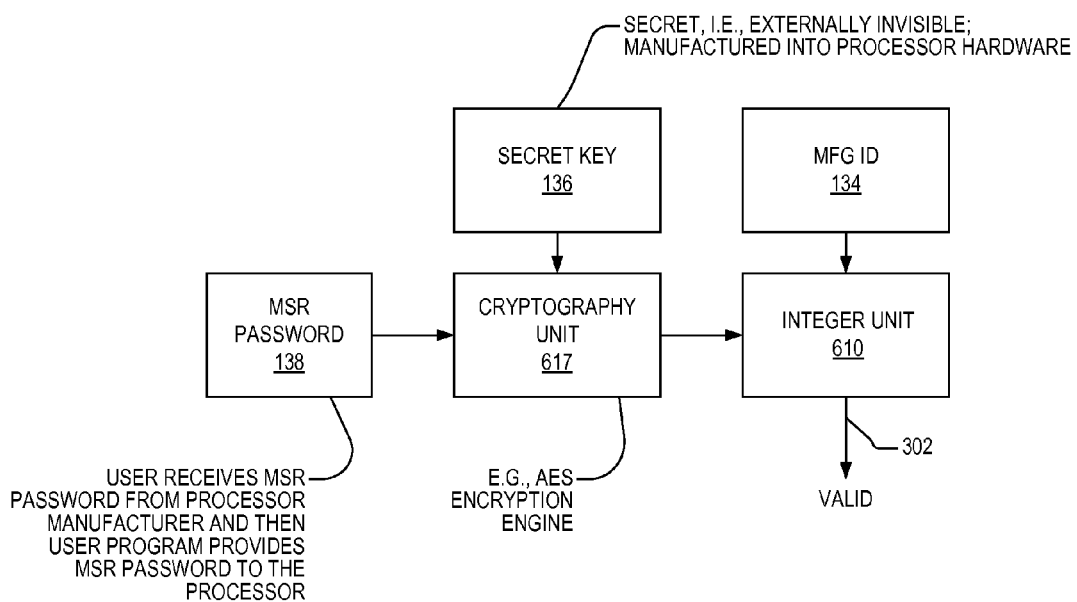
FIG. 3 is a block diagram illustrating steps described in blocks 408 through 432 of FIG. 4.

The MSR password 138 is provided as input by the user, as described below with respect to block 408 of FIG. 4 and as shown in FIG. 3, which the user receives from the microprocessor 100 manufacturer, as described below with respect to block 406 of FIG. 4 and as shown in FIG. 2.

The manufacturing ID 134 is a serial number manufactured into the microprocessor 100 hardware that is unique to each microprocessor 100 part. Because the manufacturing ID 134 is a serial number, it is a relatively predictable number. In one embodiment, the manufacturing ID 134 is a 50-bit number blown into fuses of the microprocessor 100. The manufacturing ID 134 is visible to users. In one embodiment, a user may read the manufacturing ID 134 via a RDMSR instruction.

The secret key 136 is a secret value manufactured into the hardware of the microprocessor 100 that is not externally visible. The secret key 136 is known only by a small number of authorized personnel of the manufacturer. The secret key 136 can be read internally by microcode of the microprocessor 100, but may not be read externally to the microprocessor 100. Thus, the secret key 136 cannot be obtained by any external program executing on the microprocessor 100; rather, the secret key 136 may only be obtained if one of the persons who know the secret key 136 reveals it or if someone examines the physical silicon and/or metal layers of the microprocessor 100 and discovers the location and arrangement of the secret key 136 manufactured into the hardware of the microprocessor 100. In one embodiment, the secret key 136 is the same for all instances of the microprocessor of the same manufacturer. In one embodiment, the secret encryption key 136 is 128 bits.

Figure 4:
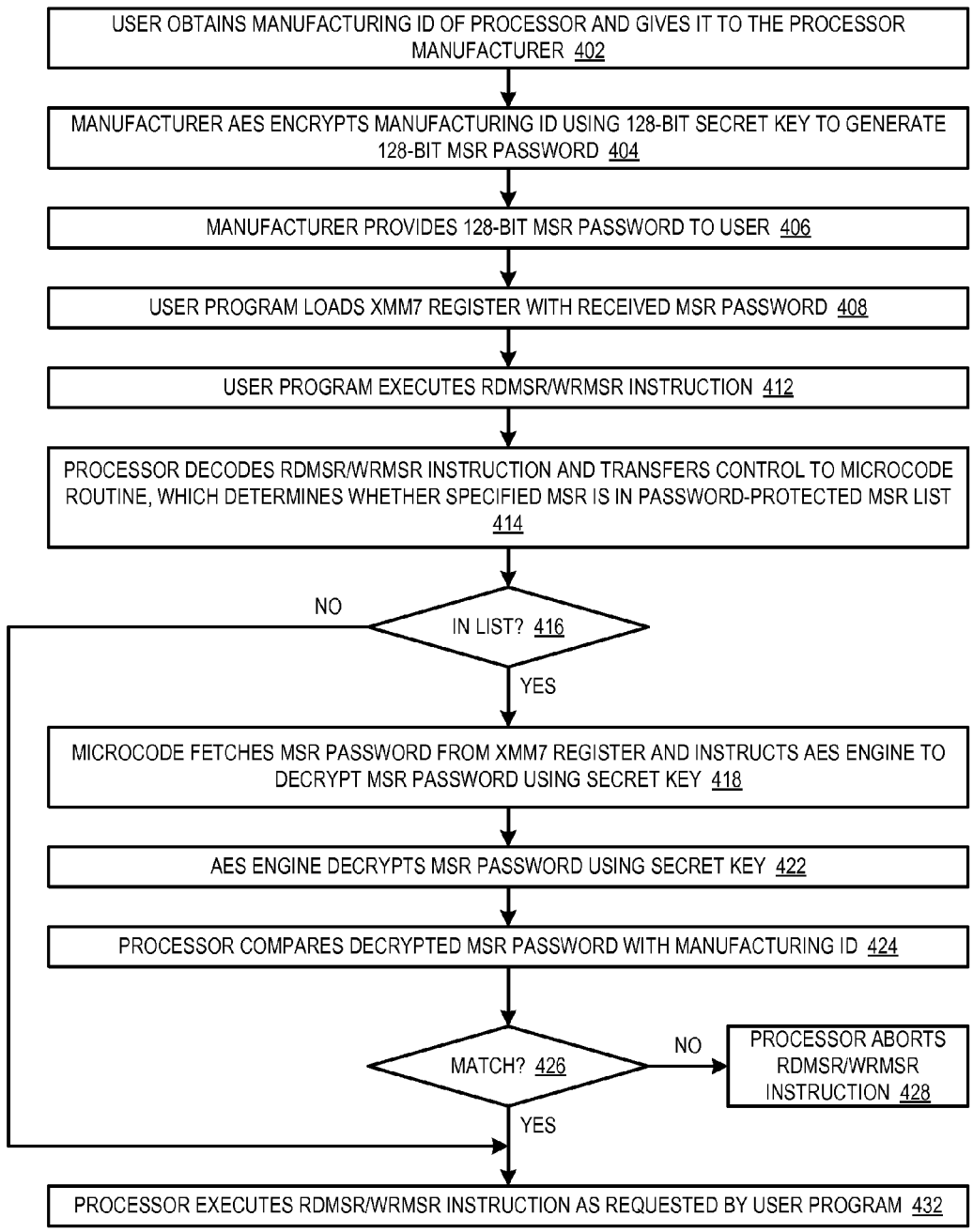
FIG. 4 is a flowchart illustrating operation according to one embodiment of the present invention.

Referring now to FIG. 4, a flowchart illustrating operation according to one embodiment of the present invention is shown. The steps described in blocks 402 through 406 of FIG. 4 are also described pictorially in the block diagram of FIG. 2, and many of the steps described in blocks 408 through 432 of FIG. 4 are also described pictorially in the block diagram of FIG. 3. Flow begins at block 402.

At block 402, the user desires to read/write an MSR 132 of his microprocessor 100, so he obtains the manufacturing ID 134 of the microprocessor 100. In one embodiment, the user reads an architected non-password-protected MSR 132 of the microprocessor 100. The user then contacts the microprocessor 100 manufacturer, and provides the manufacturing ID 134, and requests an MSR password 138. Flow proceeds to block 404.

At block 404, the manufacturer encrypts the manufacturing ID 134 using the secret key 136 to generate the MSR password 138 using an encryption function 202, as shown in FIG. 2. Encrypting the manufacturing ID 134 using the secret key 136 provides extremely high security for the password-protected MSRs 132 since it is statistically essentially impossible using current computing methods for anyone who does not know the secret key 136, even if he knows the encryption algorithm, to calculate the MSR password 138 even if they know the manufacturing ID 134. In one embodiment, the secret key 136 is 128 bits and the generated MSR password 138 is 128 bits, although other embodiments are contemplated. Furthermore, it is statistically essentially impossible using current computing methods to discover the secret key 136 even if one has the manufacturing ID 134 and the generated MSR password 138 provided by the manufacturer. In one embodiment, the encryption function 202 used by the manufacturer is AES encryption, although other embodiments are contemplated. It is noted that the plain text input and the cipher text output of AES encryption have the same number of bits. Thus, in embodiments in which the manufacturing ID 134 contains fewer bits than the MSR password 138, the manufacturer pads the manufacturing ID 134 to the same number of bits as the MSR password 138 before AES encrypting the manufacturing ID 134 to generate the MSR password 138. In one embodiment, the manufacturer uses a program written to encrypt the manufacturing ID 134 to generate the MSR password 138. The program may run on any system that includes a processor capable of executing a program that performs the encryption algorithm used. Although not required, the system may include a microprocessor 100 according to the present invention that includes the cryptography unit 617 for performing the encryption algorithm. Flow proceeds to block 406.

At block 406, the manufacturer provides to the user the MSR password 138 generated at block 404, such as via telephone, email, website, ftp, paper mail, etc. Flow proceeds to block 408.

At block 408, the user program loads the MSR password 138 received from the manufacturer at block 406 into a register of the microprocessor 100. In one embodiment, the register is the XMM7 register of the x86 SSE programming environment. In an alternate embodiment, the user program loads the MSR password 138 into system memory and loads a general purpose register of the microprocessor 100 with a pointer to the memory location storing the MSR password 138. Flow proceeds to block 412.

At block 412, the user program executes a RDMSR or WRMSR instruction that specifies a particular MSR 132 to be read or written. Flow proceeds to block 414.

At block 414, the processor decodes the RDMSR or WRMSR instruction and transfers control to a microcode routine in the microcode ROM 604 of FIG. 1. The microcode determines whether the specified MSR 132 is in the list of password-protected MSRs. In one embodiment, architected MSRs are not included in the list of password-protected MSRs. In one embodiment, the list of password-protected MSRs may be changed by blowing fuses on the microprocessor, as described in U.S. patent application Ser. No. 12/391,781 (CNTR.2428), filed Feb. 24, 2009, which is hereby incorporated by reference herein in its entirety for all purposes. Flow proceeds to decision block 416.

At decision block 416, if the MSR 132 specified by the RDMSR/WRMSR instruction is not in the list of password-protected MSRs, flow proceeds to block 432; otherwise, flow proceeds to block 418.

At block 418, the microcode fetches the MSR password 138 from the register (or memory) and instructs the cryptography unit 617 to decrypt the MSR password 138 using the secret key 136. Flow proceeds to block 422.

At block 422, the cryptography unit 617 decrypts the MSR password 138 using the secret key 136 to generate a decrypted MSR password, as shown in FIG. 3. Flow proceeds to block 424.

At block 424, the integer unit 610 compares the decrypted MSR password generated at block 422 with the manufacturing ID 134, as shown in FIG. 3. In FIG. 3, the integer unit 610 generates a valid indicator 302 that indicates whether the manufacturing ID 134 is included in the decrypted MSR password. As mentioned above, the decrypted MSR password and the manufacturing ID 134 may have an unequal number of bits, in which case the integer unit 610 compares only the relevant bits of the decrypted MSR password with the manufacturing ID 134. Flow proceeds to decision block 426.

At decision block 426, if the decrypted MSR password matches the manufacturing ID 134, flow proceeds to block 432; otherwise, flow proceeds to block 428.

At block 428, the microprocessor 100 aborts the RDMSR/WRMSR instruction. In one embodiment, the microprocessor 100 generates a general protection fault. Flow ends at block 428.

At block 432, the processor executes the RDMSR or WRMSR instruction as requested by the user program. Flow ends at block 432.

In an alternate embodiment, the basic notion may be extended to an individual MSR 132 basis. That is, each MSR 132 may have its own unique MSR password 138, rather than each microprocessor 100 part having its own unique MSR password 138. In such an embodiment, at block 402 the user provides to the manufacturer not only the manufacturing ID 134 of the microprocessor 100, but also the MSR 132 number (that is loaded into the ECX register for a RDMSR/WRMSR instruction) of the MSR 132 the user desires to access. The manufacturer then appends the MSR 132 number to the manufacturing ID 134 to do the encryption at block 404. At block 424, the integer unit 610 compares both the manufacturing ID 134 and the MSR 132 number specified by the RDMSR/WRMSR instruction with the decrypted value.

Figure 5:
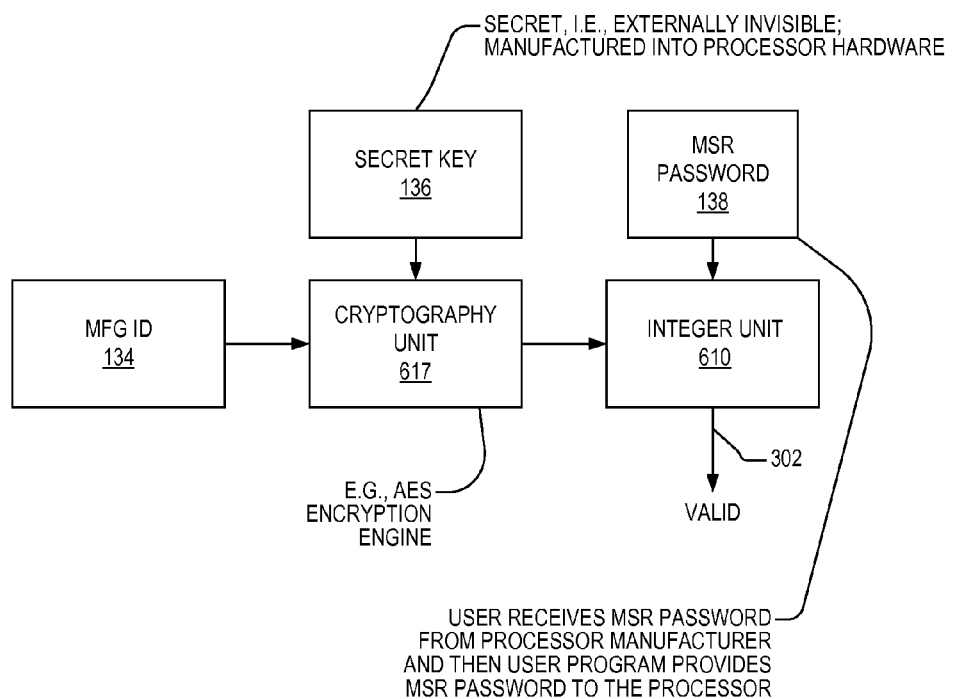
FIG. 5 is a block diagram illustrating steps described in blocks 408 through 432 of FIG. 4 according to an alternate embodiment.

In an alternate embodiment, to determine the validity of the user-supplied MSR password 138, steps 422 and 424 of FIG. 4 are modified such that at block 422, rather than decrypting the user-supplied MSR password 138, the microprocessor 100 encrypts the manufacturing ID 134 to generate a result; and, at block 424, rather than comparing the decrypted result of the user-supplied MSR password 138 with the manufacturing ID 134, the microprocessor 100 compares the user-supplied MSR password 138 with the result generated in modified block 422. This embodiment is shown pictorially in FIG. 5.

Advantageously, the embodiments described herein provide the microprocessor manufacturer extremely tight control over access to password-protected MSRs of the microprocessor in order to prevent undesirable access thereto.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor having a control register to which the manufacturer of the microprocessor may limit access, the microprocessor comprising:
   a manufacturing identifier, that uniquely identifies the microprocessor, wherein the manufacturing identifier is externally readable from the microprocessor by a user;
   a secret key, manufactured internally within the microprocessor, wherein the secret key is externally invisible;
   an encryption engine, coupled to the secret key, configured to decrypt a user-supplied password using the secret key to generate a decrypted result in response to a user instruction instructing the microprocessor to access the control register, wherein the user-supplied password is unique to the microprocessor; and
   an execution unit, coupled to the manufacturing identifier and the encryption engine, configured to allow the instruction access to the control register if the manufacturing identifier is included in the decrypted result, and to otherwise deny the instruction access to the control register.

2. The microprocessor of claim 1, wherein the user-supplied password comprises a value provided by the manufacturer to the user.

3. The microprocessor of claim 2, wherein the user-supplied password is generated by the manufacturer by encrypting the uniquely-identifying manufacturing identifier of the microprocessor with a same encryption algorithm used by the encryption engine to decrypt the user-supplied password.

4. The microprocessor of claim 1, wherein the encryption engine comprises an advanced encryption standard (AES) engine.

5. The microprocessor of claim 1, wherein the secret key is known only by the manufacturer of the microprocessor.

6. The microprocessor of claim 1, wherein the secret key is readable only by microcode of the microprocessor.

7. The microprocessor of claim 1, further comprising:
   a plurality of control registers;
   wherein the instruction specifies which one of the plurality of control registers to access;
   wherein the user-supplied password is unique both to the microprocessor and to the one of the plurality of control registers specified by the instruction.

8. The microprocessor of claim 1, wherein the user-supplied password is unique both to the microprocessor and to whether the instruction instructs the microprocessor to read or write the control register.

9. The microprocessor of claim 1, wherein the instruction comprises an x86 RDMSR or WRMSR instruction.

10. The microprocessor of claim 1, further comprising:
    a plurality of fuses, selectively blown with the manufacturing identifier.

11. A method for limiting access to a control register of a microprocessor, the method comprising:
    decoding a user instruction instructing the microprocessor to access the control register;
    decrypting a user-supplied password using a secret key to generate a decrypted result in response to said decoding, wherein the user-supplied password is unique to the microprocessor, wherein the secret key is manufactured internally within the microprocessor but is externally invisible; and
    denying the instruction access to the control register if a manufacturing identifier is not included in the decrypted result, wherein the manufacturing identifier uniquely identifies the microprocessor and is externally readable from the microprocessor by a user;
    wherein said decoding, said decrypting, and said denying are all performed by the microprocessor.

12. The method of claim 11, wherein the user-supplied password comprises a value provided by the manufacturer to the user.

13. The method of claim 12, wherein the user-supplied password is generated by the manufacturer by encrypting the uniquely-identifying manufacturing identifier of the microprocessor with a same encryption algorithm used by the encryption engine to decrypt the user-supplied password.

14. The method of claim 11, wherein said encrypting is performed according to an advanced encryption standard (AES) encryption algorithm.

15. The method of claim 11, wherein the secret key is known only by the manufacturer of the microprocessor.

16. The method of claim 11, wherein the secret key is readable only by microcode of the microprocessor.

17. The method of claim 11, wherein the microprocessor includes a plurality of control registers, wherein the instruction specifies which one of the plurality of control registers to access, wherein the user-supplied password is unique both to the microprocessor and to the one of the plurality of control registers specified by the instruction.

18. The method of claim 11, wherein the user-supplied password is unique both to the microprocessor and to whether the instruction instructs the microprocessor to read or write the control register.

19. The method of claim 11, wherein the instruction comprises an x86 RDMSR or WRMSR instruction.

20. The method of claim 11, where the manufacturing identifier is selectively blown within a plurality of fuses of the microprocessor.

21. A microprocessor having a control register to which the manufacturer of the microprocessor may limit access, the microprocessor comprising:
    a manufacturing identifier, that uniquely identifies the microprocessor, wherein the manufacturing identifier is externally readable from the microprocessor by a user;
    a secret key, manufactured internally within the microprocessor, wherein the secret key is externally invisible;
    an encryption engine, coupled to the secret key, configured to encrypt the manufacturing identifier using the secret key to generate an encrypted result in response to a user instruction instructing the microprocessor to access the control register; and
    an execution unit, coupled to the encryption engine, configured to allow the instruction access to the control register if the encrypted result matches a user-supplied password, and to otherwise deny the instruction access to the control register, wherein the user-supplied password is unique to the microprocessor.

22. A method for limiting access to a control register of a microprocessor, the method comprising:
- decoding a user instruction instructing the microprocessor to access the control register;
- encrypting a manufacturing identifier using a secret key to generate an encrypted result in response to said decoding, wherein the secret key is manufactured internally within the microprocessor but is externally invisible, wherein the manufacturing identifier uniquely identifies the microprocessor and is externally readable from the microprocessor by a user; and
- denying the instruction access to the control register if the encrypted result does not match a user-supplied password, wherein the user-supplied password is unique to the microprocessor;
- wherein said decoding, said encrypting, and said denying are all performed by the microprocessor.

* * * * *